United States Patent
Davis et al.

(10) Patent No.: US 10,168,912 B2
(45) Date of Patent: Jan. 1, 2019

(54) SHORT STROKING AND DATA TIERING FOR A DISTRIBUTED FILESYSTEM

(71) Applicant: Panzura, Inc., Campbell, CA (US)

(72) Inventors: Andrew P. Davis, Santa Cruz, CA (US); John Richard Taylor, Tiburon, CA (US)

(73) Assignee: Panzura, Inc., Campbell, CA (US)

( * ) Notice: Subject to any disclaimer, the term of this patent is extended or adjusted under 35 U.S.C. 154(b) by 334 days.

(21) Appl. No.: 15/046,059

(22) Filed: Feb. 17, 2016

(65) Prior Publication Data

US 2017/0235485 A1    Aug. 17, 2017

(51) Int. Cl.
*G06F 3/06* (2006.01)
*G06F 17/30* (2006.01)

(52) U.S. Cl.
CPC ............ *G06F 3/061* (2013.01); *G06F 3/0631* (2013.01); *G06F 3/0644* (2013.01); *G06F 3/0674* (2013.01); *G06F 17/30082* (2013.01); *G06F 17/30132* (2013.01); *G06F 17/30194* (2013.01)

(58) Field of Classification Search
CPC ...... G06F 3/061; G06F 3/0631; G06F 3/0644; G06F 3/0674; G06F 17/30082; G06F 17/30132; G06F 17/30194
See application file for complete search history.

(56) References Cited

U.S. PATENT DOCUMENTS

| | | | |
|---|---|---|---|
| 6,324,620 B1* | 11/2001 | Christenson | G06F 3/061 710/74 |
| 7,613,743 B1* | 11/2009 | Giampaolo | G06F 11/1474 |
| 9,792,295 B1* | 10/2017 | Rus | G06F 17/30194 |
| 2008/0005475 A1* | 1/2008 | Lubbers | G06F 3/0613 711/118 |
| 2013/0339407 A1* | 12/2013 | Sharpe | G06F 17/30194 707/827 |

* cited by examiner

*Primary Examiner* — Ramon A. Mercado
(74) *Attorney, Agent, or Firm* — Mark Spiller

(57) ABSTRACT

The disclosed embodiments disclose techniques for optimizing caching performance for a distributed filesystem. Two or more cloud controllers collectively manage distributed filesystem data that is stored in one or more cloud storage systems; the cloud controllers ensure data consistency for the stored data, and cloud controllers cache portions of the distributed filesystem on hard drives with rotating disk platters. The outside portions of these disk platters have higher I/O bandwidth than the inside portions of the disk platters. During operation, a cloud controller determines that a hot subset of cached data is likely to be accessed frequently by clients, and stores this hot subset to an outside portion of a disk platter. The cloud controller further determines that a cold subset of cache data is less likely to be accessed by clients, and stores the cold subset on an inside portion of a disk platter.

18 Claims, 6 Drawing Sheets

SHORT STROKING AND DATA TIERING FOR A DISTRIBUTED FILESYSTEM

BACKGROUND

Field of the Invention

This disclosure generally relates to techniques for providing flexible and extensible network storage systems. More specifically, this disclosure relates to techniques for storing and collaboratively accessing data in a distributed filesystem.

Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments disclose techniques for optimizing caching performance for a distributed filesystem. Two or more cloud controllers collectively manage distributed filesystem data that is stored in one or more cloud storage systems; the cloud controllers ensure data consistency for the stored data, and cloud controllers cache portions of the distributed filesystem on hard drives with rotating disk platters. The outside portions of these disk platters have higher I/O bandwidth than the inside portions of the disk platters. During operation, a cloud controller determines that a hot subset of cached data is likely to be accessed frequently by clients, and stores this hot subset to an outside portion of a disk platter. The cloud controller further determines that a cold subset of cache data is less likely to be accessed by clients, and stores the cold subset on an inside portion of a disk platter.

In some embodiments, a cloud controller maintains a linear gradient of data temperatures across the disk platter (e.g., with higher data temperatures indicating a higher likelihood of subsequent accesses). The cloud controller then stores cached data across the disk platter according to calculated data temperatures and projected access patterns.

In some embodiments, the subset of cached data initially has a low data temperature. Upon receiving a client request to access the subset of cached data, a cloud controller determines based on a set of tracked accesses that the data temperature of the subset has increased, and moves the subset from a section of the disk platter that is associated with a lower data temperature to the outside portion of the disk platter.

In some embodiments, the cloud controller determines the data temperature and location for the hot subset of cached data on the disk platter based on the frequency and recency of data use for the hot subset of cached data. Raising the data temperature for the hot subset of cached data may comprise determining that the hot subset of cached data is being accessed frequently by multiple users in a recent timeframe.

In some embodiments, the cloud controller determines the data temperature for a hot subset of cached data based on one or more of: the number of users that have accessed the hot subset of cached data; the number of times each user has accessed hot subset of cached data; the total number of times the hot subset of cached data has been accessed; the frequency and time distribution of accesses for the hot subset of cached data; and how recently users have accessed the hot subset of cached data.

In some embodiments, a cloud controller receiving a first request to access a subset of cached data is configured to, upon determining that the subset of cached data is being accessed by a single user and has not been accessed in a long time interval, continue to consider the subset of cached data to have a low data temperature. However, upon receiving a subsequent request from a second distinct user in a short subsequent timeframe, the cloud controller increases the data temperature for the subset of cached data.

In some embodiments, cloud controllers exchange access records for their locally cached data, and a cloud controller considers data accesses on remote cloud controllers when determining data temperatures for locally cached data.

In some embodiments, a set of cloud controllers collectively present a unified namespace for the distributed filesystem to the clients of the distributed filesystem. The file data for the distributed filesystem is stored in the cloud storage system, the clients access the distributed filesystem via the cloud controllers, and the cloud controllers cache a subset of the file data from the remote cloud storage system that is being actively accessed by each respective cloud controller's clients. New file data received by each cloud controller from its clients is written to the remote cloud storage system. Note that maintaining consistency involves each cloud controller maintaining a copy of the metadata for the files stored in the distributed filesystem, and that changes to the metadata for the distributed filesystem are communicated across the set of cloud controllers to ensure that the clients of the distributed filesystem share a consistent view of the files in the distributed filesystem.

In some embodiments, a cloud controller can be configured to limit the rate at which data on the inside portion of the disk platter can be accessed.

In some embodiments, a cloud controller delays requests to access the inside portion of the disk platter while performing multiple subsequent accesses to the outside portion of the disk platter. For instance, the cloud controller may batch two or more requests to the inside portion of the disk platter together to amortize seek delays to the inside portion of the disk platter. Rate-limiting accesses to the inside portion of the disk platter facilitates optimizing I/O performance for hot cached data that is cached on the hard drive.

In some embodiments, a cloud controller also includes a solid-state drive (SSD). The cloud controller may be configured to cache metadata for the distributed filesystem on the SSD and cache file data for the distributed filesystem on the hard drive using linear gradient of data temperatures.

DETAILED DESCRIPTION

Figure 1A:
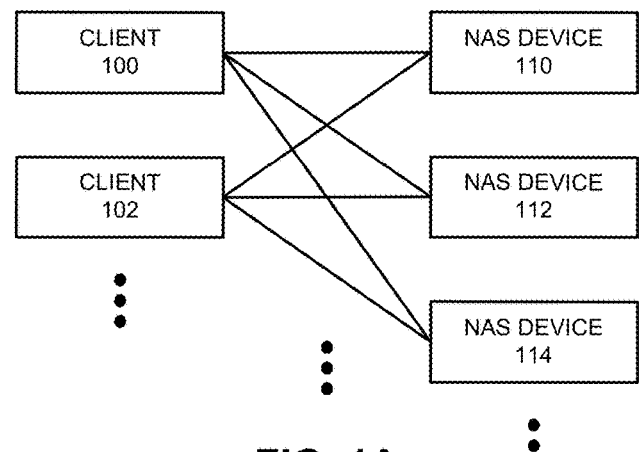
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets has motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
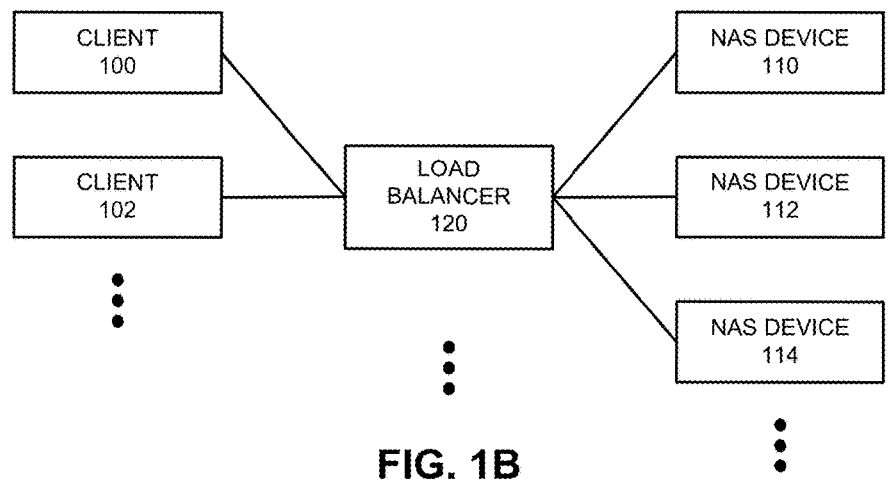
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
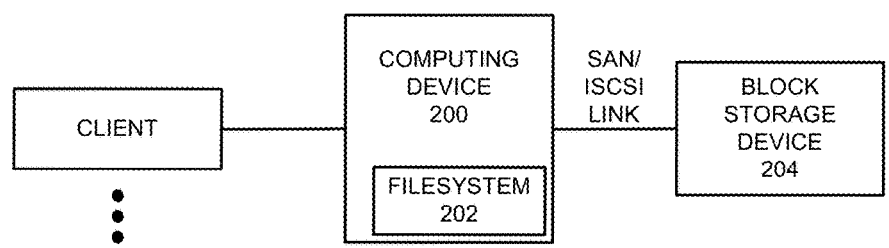
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors (also sometimes referred to as "cloud storage providers") attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that enables data to be accessed at different levels of consistency, thereby improving performance without negatively affecting application behavior.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers work together (e.g., as a federation) to manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files" or "drive files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
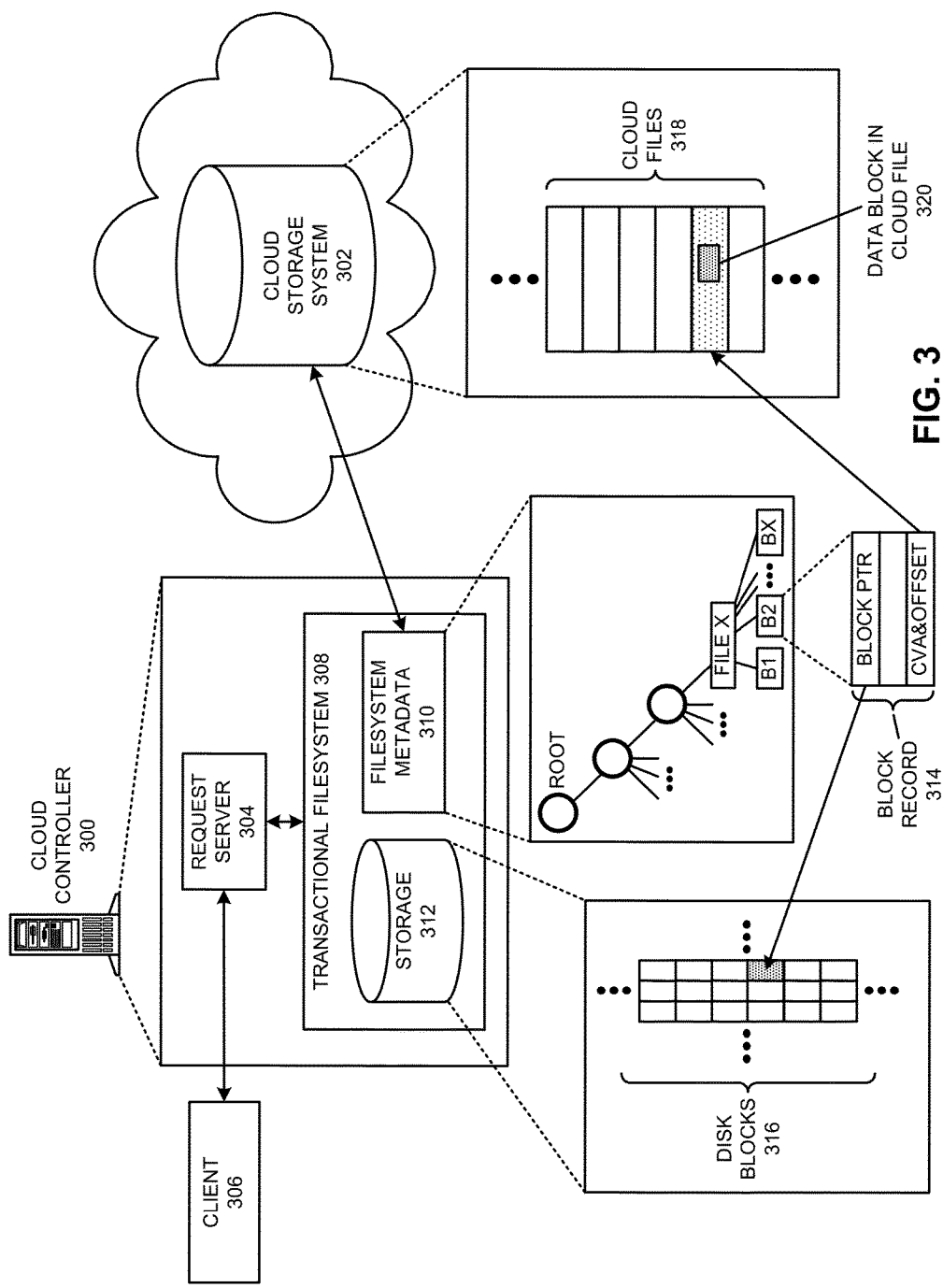
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes. For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

In some embodiments, cloud controllers may use stored snapshot data to provide access to different versions of a file. For instance, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In some embodiments, each file in the distributed filesystem is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. Additional techniques for using cloud controller to manage and access data stored in a distributed filesystem are described in more detail in pending U.S. patent application Ser. No. 13/725,767, filed 21 Dec. 2012, entitled "Accessing Cached Data from a Peer Cloud Controller in a Distributed Filesystem," by inventors John Richard Taylor, Randy Yenpang Chou, and Andrew P. Davis, which is incorporated by reference in its entirety).

Supporting Collaboration in a Distributed Filesystem

The previous sections describe a distributed filesystem in which distributed cloud controllers collectively manage (and provide consistent access to) file data that is stored in a remote cloud storage system. As described, each cloud controller maintains (and updates) a copy of the metadata for the files stored in the distributed filesystem, but only caches a subset of the data stored in the remote cloud storage system that is being accessed (or likely to be accessed) by the respective cloud controller's clients. These cloud controllers use file write locks to ensure that only a single client can write a file at a given time, and then ensure that file modifications are propagated to the remote cloud storage system (e.g., via incremental data snapshots and incremental metadata snapshots).

While the above-described techniques allow metadata and data to be synchronized across a large number of distributed cloud controllers, there may be some delay in propagating snapshots. Such delays may complicate real-time collaboration in scenarios where multiple clients that are distributed across multiple cloud controllers attempt to collaboratively edit and/or access the same files and/or directories. Hence, in some embodiments, cloud controllers may be configured to selectively notify other cloud controllers of changes to specified files. Such techniques may involve reducing delays for collaborative file accesses in a distributed filesystem while ensuring strong read-after-write consistency by allowing cloud controllers to register for change notifications and selectively send change notifications for targeted files. These techniques are described in more detail in pending U.S. patent application Ser. No. 14/298,598, filed 6 Jun. 2014, entitled "Distributed Change Notifications for a Distributed Filesystem," by inventors John Richard Taylor and Yun Lin, which is incorporated by reference in its entirety.

Managing Client Caching in a Distributed Filesystem

In some embodiments, cloud controllers are extended to facilitate client caching. More specifically, cloud controllers can be extended to support "distributed oplock" capabilities that allow cloud controllers to grant opportunistic lock requests and also allow remote cloud controllers to initiate the revocation of opportunistic client locks. Distributed oplocks allow each cloud controller to provide locking capabilities that facilitate client caching (e.g., lock files and perform buffered writes) for files stored in the distributed filesystem while also providing the capability to revoke client locks as needed when distributed clients attempt to collaboratively edit files. The distributed cloud controllers work together to collectively grant locks as requested (where possible), revoke locks as needed, and propagate file changes to their clients, thereby transparently providing the abstraction of a single local fileserver to clients while maintaining strong read-after-write consistency (when needed) for a distributed filesystem. Techniques for extending cloud controllers to support client caching are described in more detail in pending U.S. patent application Ser. No. 14/298,496, filed 6 Jun. 2014, entitled "Managing Opportunistic Locks in a Distributed Filesystem," by inventors Yun Lin and John Richard Taylor, which is incorporated by reference in its entirety.

Synchronization Updates Between Cloud Controllers

In some embodiments, the cloud controllers of a distributed filesystem may be configured to selectively close the synchronization gap of bulk update techniques (such as incremental metadata snapshots) when needed by enabling additional direct transfers of data between two cloud controllers. Such techniques can be used to craft "metadata deltas" that support fast, granular interaction between two (or more) clients that are working on the same set of files via different cloud controllers. Such techniques can involve directly synchronizing changes between cloud controllers to propagate file modifications to collaborators more quickly and proactively pre-synchronizing related files, and are described in more detail in pending U.S. patent application Ser. No. 14/313,703, filed 24 Jun. 2014, entitled "Synchronizing File Updates Between Two Cloud Controllers of a Distributed Filesystem," by inventors Brian Christopher Parkison, Andrew P. Davis, and John Richard Taylor, which is incorporated by reference in its entirety.

Managing Consistency Levels for Files

The previous sections disclose techniques that enable different levels of file consistency to support a range of application and/or collaborative access styles for files in a distributed filesystem. Cloud controllers that manage a distributed filesystem can be configured to enable different levels of file consistency to support a range of application and/or collaborative file access styles. Higher consistency levels facilitate collaborative accesses for distributed clients but may involve additional communication between cloud controllers. Cloud controllers can dynamically adjust the consistency level for individual files as needed based on system and access characteristics to balance performance, fault-tolerance, and application-specific requirements. Techniques for dynamically adjusting the consistency levels for files are described in more detail in pending U.S. patent application Ser. No. 14/482,923, filed 10 Sep. 2014, entitled "Managing the Level of Consistency for a File in a Distributed Filesystem," by inventors Yin Lin, Steve Hyuntae Jung, Vinay Kumar Anneboina, and John Richard Taylor, which is incorporated by reference in its entirety.

Short-Stroking and Data Tiering for a Distributed Filesystem

As described previously, cloud controllers cache distributed filesystem data. More specifically, cloud controllers can download and cache distributed filesystem data that is stored in a cloud storage provider and synchronize more recent versions of distributed filesystem data from other cloud controllers. Each cloud controller may include and be configured to store cached data on one or more of: solid-state drives (SSDs); hard drives that include rotating disks and may include solid state caches (such hard drives are interchangeably referred to as hard drives, rotating drives, and/or disk drives in this disclosure); and a range of other storage devices. How cached data is mapped to and accessed from such storage devices can substantially impact the performance of data accesses for clients of the distributed filesystem.

The I/O performance of a hard drive is typically based on a number of factors, which include: rotation speed (and hence rotational delay); the seek time of the disk heads; the settling time of the disk heads; the presence of a cache, and if so, its size and speed; and the bus speed of the bus that connects the drive to the drive's host computing device. Specific delays that are considered when calculating access times include:

Rotational delay: the time latency needed for a drive platter to rotate so that a desired sector is located under a disk head.
   Seek time: the amount of time required for an actuator to position the disk head over the desired sector.
   Settling time: a time interval between when the disk head arrives at the desired sector and is ready to provide the desired operation (e.g., a read head or a write head for a read or write operation, respectively). Note that write heads typically need to be closer than read heads to the recording surface (to perform accurate writes that do not distort neighboring data), and hence the write settling time is typically longer than the read settling time. The settling and seek times are typically combined as a single overall latency value.

Head switch time: the time needed to switch from using a disk head on one side of a disk platter to a disk head on the other side of the same platter (e.g., when making such a transition, the opposing head needs to re-settle on its target track).

Cylinder skew time: disk tracks are marked with index markers that indicate where the given track starts. Cylinder skew time indicates the time interval between the index markers for tracks in a given zone. Locating successive index markers in the same position on the platter would mean that accessing each subsequent track would require waiting for a full disk rotation. Skewing index markers to be offset some distance from each other allows the heads to land right on top of a subsequent index marker after leaving the last sector on the neighboring track, thereby reducing rotational delays. This offset can be adjusted to facilitate a seek and subsequent head settle after accessing a neighboring track.

Note that the rotational speed (rotations per minute, or RPM) for a rotating disk is typically fixed, which means that the outer edge of the disk platter travels under the disk head at a higher linear velocity than the inner edge of the disk platter. Disk heads can be configured to write at different densities to optimize the available storage area. For instance, disk heads may be configured to write at their maximum possible speed and density on the outside of the platter (e.g., as densely as possible given the high linear velocity). This write rate may, however, be denser than can be supported by the disk surface on the inner edge of the platter (e.g., when writing at maximum density at the lowest linear velocity), and thus the disk heads may be configured to "de-rate" (e.g., write more slowly) towards the inside of the disk platter. For example, a disk may be mapped into discrete sections, with each section being associated with a specified write rate (density) based on the calculated linear velocity, thereby maximizing the storage capacity of the disk drive. Note that one side effect of this technique is that the outer portions of the disk platter store more data than the inner portions of the disk platter, and thus that more data can be read per disk rotation from the outer portions of the disk platter. For instance, in some devices, the outer third of the disk may comprise more than half of the storage capacity of the disk.

"Short-stroking" techniques leverage the higher storage density of the outer portions of disk platters to optimize I/O performance. More specifically, short-stroking techniques confine reads and writes to the outside edge of the disk, effectively limiting the distance that the heads need to move to reduce seek latency (and thereby increase I/O performance). However, because short-stroking techniques use only a small percentage of the available disk platter, such techniques can waste a substantial amount of the storage capacity of a hard drive; for example, in some scenarios only five percent of the storage capacity of a hard drive may actually be used. However, such storage sacrifices may be considered reasonable trade-offs in I/O intensive environments, depending on the workload. Consider, for instance, an online transaction processing system that needs to calculate end-of-quarter financial data as quickly as possible. In such a system, the primary constraint may be data throughput, not storage capacity; if the data set is not particularly large, a relatively small set of short-stroked disk drives may be able to provide higher overall data throughput than a substantially larger number of non-short-stroked disk drives purely based on access latencies.

In some embodiments, data-tiering techniques can be combined with short-stroking techniques to reduce wasted storage space. More specifically, frequently-used data can be stored in disk areas that benefit from higher performance (e.g., the outer edges of the disk platter), while less performance-critical and/or frequently-used data is stored in the middle and inner portions of the disk platter. Such techniques improve the cache behavior and access performance of cloud controllers for a distributed filesystem by combining the improved I/O performance of short-stroking without compromising the overall (disk) cache size.

Consider an exemplary scenario in which a cloud controller uses local disk drives to cache data for a distributed filesystem, disk I/O is two to three times faster on the outer edge of the disk platters than on the inner edge of the disk platters, and disk I/O is 10 to 100 times faster than data accesses from a remote cloud storage provider. In this scenario, short-stroking techniques could facilitate two to three times faster data throughput, effectively increasing the number of concurrent users and/or applications that can be supported by the cloud controller. However, the benefits of local caching only apply to data that can actually be cached on the local disks; the reduction in cache space due to short-stroking may result in dramatically more (and much slower) cloud accesses that could decrease overall filesystem performance significantly. The disclosed techniques facilitate using all of the locally available disk space for caching purposes (to reduce the number of cloud download operations where possible) while also leveraging the improved performance of short-stroking techniques.

In some embodiments, leveraging short-stroking and data-tiering techniques in a distributed filesystem involves: 1) selecting and using metrics that can accurately predict a "hot" data set (e.g., a frequently-accessed data set, in contrast with a "cold," or infrequently/unlikely to be re-accessed data set) in a multi-user caching environment; 2) moving data that is cached in a hard drive to optimize performance based on such metrics; and 3) performing rate-shaping to optimize I/O performance for the hard drive. These three techniques can be combined to substantially improve the caching performance and capabilities of a cloud controller.

In some embodiments, an optimized set of metrics are tailored to accurately predict the hot data set in a multi-user caching environment. More specifically, a cloud controller uses a set of reference statistics to determine the hot/warm/cold nature of cached data (i.e., the likelihood of data being re-accessed frequently in the near future), and then ensures that the data is placed (and, as needed, relocated over time) based on those reference statistics in an attempt to maximize data access performance. Placement decisions may be based on a range of factors that include implicit or explicit qualities of the data (e.g., file types, previous access frequency, predicted access frequency, etc.), with cached data that is predicted to be accessed less frequently being stored in the slower portions of the disk drive. For example, a cloud controller may be configured to map coarse areas of a disk drive to be hot, warm, and cold, or may alternatively maintain a linear gradient across the disk (e.g., hottest, hot, warmest, warm, cool, cold, coldest) according to projected access patterns. Note that user and system hints may also be considered in placement decisions; e.g., data that has been marked by a user as archive data may automatically be moved to slower portions of the disk drive or completely out of the local cache to the cloud storage system.

Figure 6:
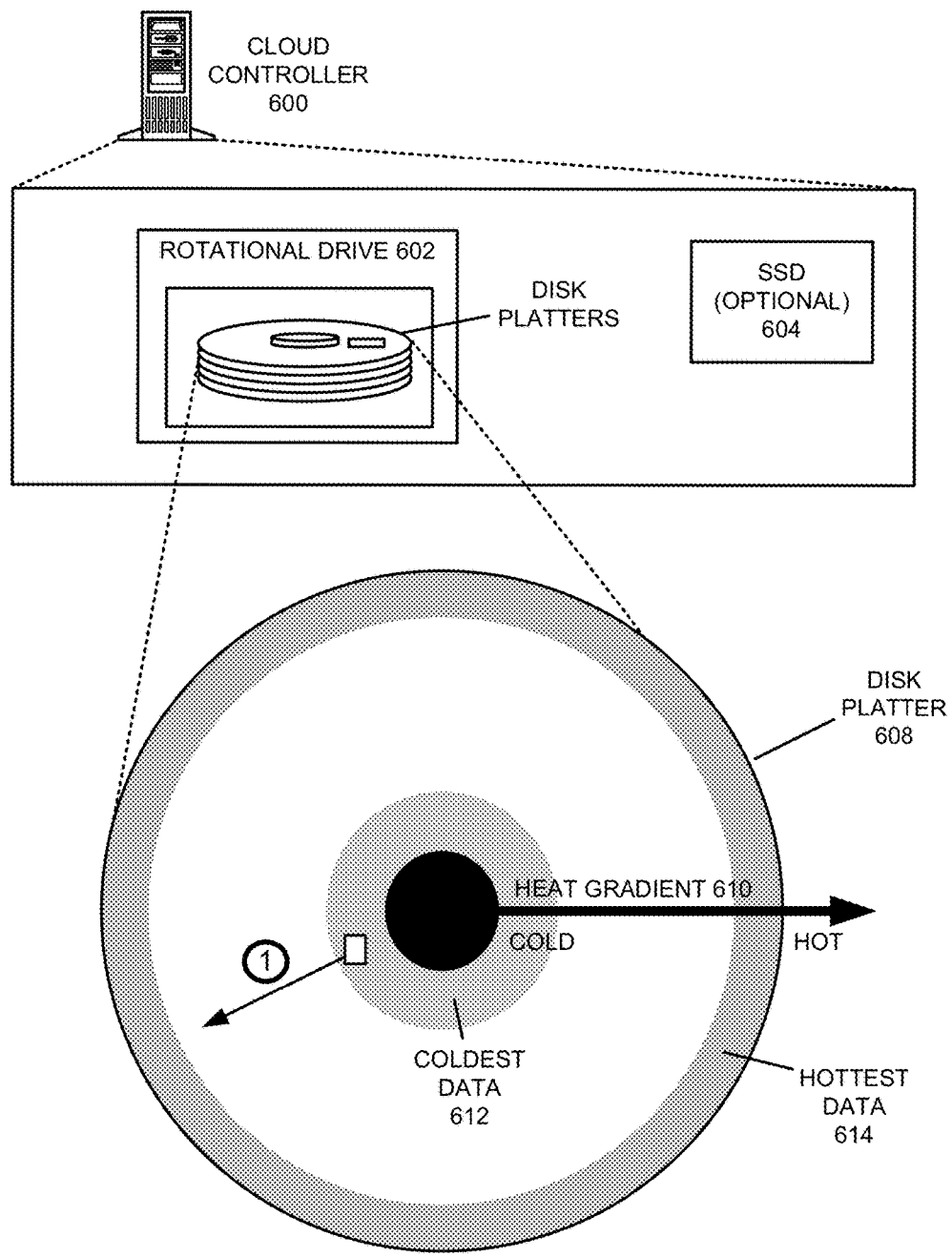
FIG. 6 illustrates a cloud controller that caches distributed filesystem data on a rotational drive in accordance with an embodiment.

FIG. 6 illustrates a cloud controller that caches distributed filesystem data on a rotational drive 602 and (optionally) an SSD 604 (as described below). As described above, cloud controller 600 maintains a heat gradient 610 for disk platter 608 of rotational drive 602; more specifically, cloud controller 600 strives to store cached data such that: the hottest data 614 is stored on the outside edge of disk platter 608 (which has the highest storage density); the coldest data 612 is stored on the inside edge of disk platter 608; and other temperatures of data are stored to disk platter 608 based on their temperature (e.g., expected future access likelihood and frequency).

Figure 7:
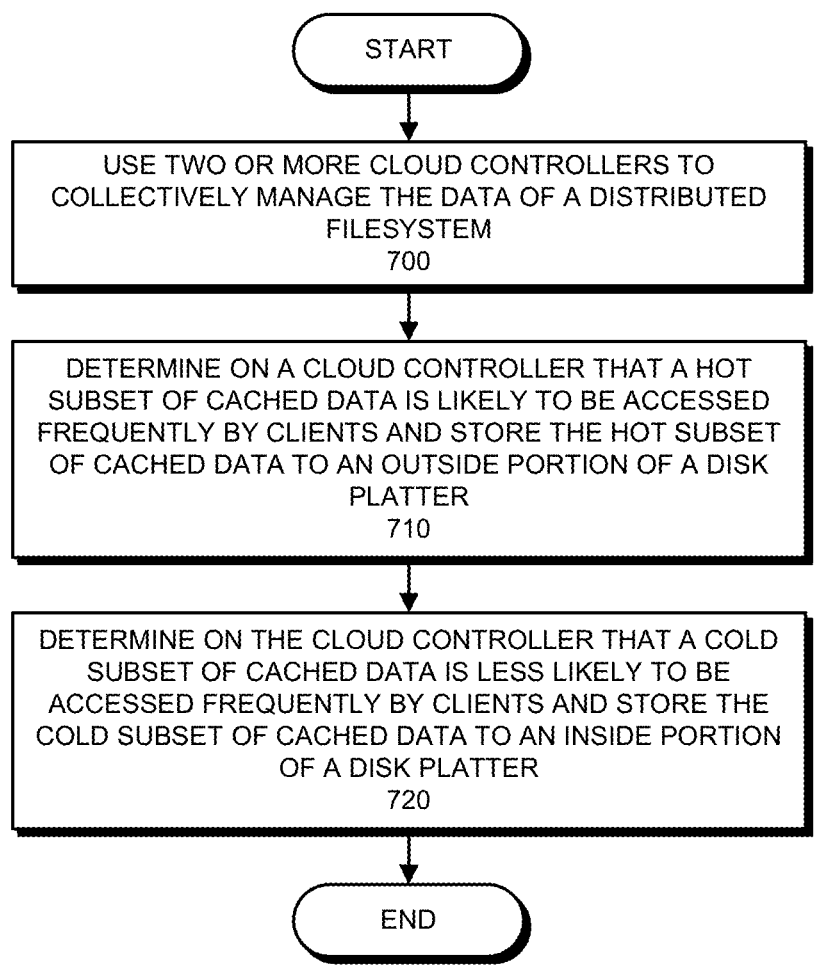
FIG. 7 presents a flow chart that illustrates the process of leveraging short-stroking and data-tiering in a distributed filesystem in accordance with an embodiment.

FIG. 7 presents a flow chart that illustrates the process of leveraging short-stroking and data-tiering in a distributed filesystem. Two or more cloud controllers collectively manage distributed filesystem data that is stored in one or more cloud storage system (operation 700); the cloud controllers ensure data consistency for the stored data, and one or more cloud controllers cache portions of the distributed filesystem on hard drives with rotating disk platters. The outside portions of these disk platters have higher I/O bandwidth than the inside portions of the disk platters. During operation, a cloud controller determines that a hot subset of cached data is likely to be accessed frequently by clients, and stores this hot subset to an outside portion of a disk platter (operation 710). The cloud controller further determines that a cold subset of cache data is less likely (or unlikely) to be accessed by clients, and stores the cold subset on an inside portion of a disk platter (operation 720).

Many caching techniques determine the set of data to be cached based on "LRU" (least-recently used) techniques that leverage temporal locality in data accesses. In LRU, data that was recently accessed is assumed to be likely to be accessed again soon, and data that has not been accessed recently is considered cold and can be evicted. However, LRU techniques can be sub-optimal in a multi-user caching environment. Consider a scenario in which a cloud controller manages its disk cache using LRU techniques, and a user scans through the distributed filesystem (e.g., searching for a document containing a specific phrase); under an LRU-based approach, the cloud controller might mark all of the file data that is accessed by this search as hot and evict cached data that is being used by other users, thereby triggering cache thrashing. One-time accesses by a single user are not necessarily indications that the accessed data is hot, and hence cloud controller caching techniques need to be enhanced to consider multiple users, short stroking, and data tiering.

In some embodiments, cloud controllers are configured to consider frequency and recency of data use for cached data in caching and disk placement decisions. For instance, when determining how "hot" a piece of cached data is, a cloud controller may consider one or more of: the number of users that have accessed the data; the number of times each specific user has accessed the data; the total number of accesses for the data; the frequency of accesses for the data over time; and how recently some or all of the data accesses occurred. Data that is "least frequently used" (LFU) will tend to remain cold; e.g., a cloud controller receiving a request to read cold data just once might not immediately mark that data as hot, but may instead record (i.e., track) the access and continue to consider the data to be cooler than other data that has been read more than once in a recent timeframe. For example, a cloud controller might strive to place data across disk platters as follows (from the outside of the disk platter inwards):

place data that has been read multiple times by multiple users in a recent timeframe (e.g., three days) on the outside edges of disk platters, followed by data that has been read more than once in a longer timeframe (e.g., the last 10 days), followed by data that has been read only once recently, and data that has not been read recently, but has been predicted will be read soon, and hence preemptively downloaded from the cloud storage system.

Using such a scheme, data accessed multiple times by one or more users is considered hotter than data accessed only once, and a user scanning through cold data might increase the temperature of data (e.g., based on the gradient) but not necessarily move cold data beyond the middle of the disk platter. Detecting a second subsequent user accessing the same data in a short timeframe might motivate a cloud controller to increase the temperature of the data (i.e., moving that data to a higher tier) due to both the frequency and recency of the accesses. Note that data access information may be maintained at both a local and system-wide level. For instance, each cloud controller may track and consider local accesses, but cloud controllers may also exchange access records (e.g., by propagating such information or a subset thereof via incremental metadata updates) and consider data accesses on remote cloud controllers when making local caching decisions. For example, remote access information may be considered but associated with a lower weight than a local tracked access history.

In some embodiments, cloud controllers are configured to rebalance the location of cached data on disk drives based on "data temperature" to optimize performance. For instance, a cloud controller may move hot data to the outer edges of disk platters and migrate cold data towards the inner edges of disk platters to reduce the seek and access times for hot data. In some embodiments, a cloud controller can perform such rebalancing when client requests load is low and the disk drives are relatively idle. Alternatively, cloud controllers may also be configured to rebalance opportunistically during normal operations. For example, upon receiving a client request for a previously cold data segment, the cloud controller may: (1) determine that the requested data is likely to be increasing in temperature (e.g., based on a file type, application hint, or other statistical information); (2) store the requested data in a memory cache; and (3) upon receiving a subsequent request to access other hot data (which results in the disk heads being moved to the outer edge of the disk platter to access the hot data), write the earlier requested data to the outer edge of the disk platter. A cloud controller can move cooling data inwards towards the center of the disk in a similar manner. Both idle and active rebalancing facilitate improving the data throughput of subsequent requests for hot data. Note that cloud controllers may be further configured to co-locate related data when rebalancing; for instance, a cloud controller moving data may strive relocate portions of fragmented or related files contiguously (and/or closer to each other) when moving them.

In the context of FIG. 6, operation 1 illustrates the movement of cold data from the inner portion of disk platter 608 towards the outer portion of disk platter 608 in response to multiple user requests for an initially cold (and now increasing in temperature) data segment.

In an ideal scenario, cloud controllers maintain a clear data storage gradient in which the hottest data is stored on the outside edge of the disk platter, the coldest data is stored on the inside edge, and everything in between is mapped precisely according to the gradient. However, keeping all data mapped across the drive optimally over time may involve substantial data movement overhead. Thus, in some embodiments, cloud controllers may be configured to consider a coarse, discrete number of regions instead of a continuous gradient, thereby providing many of the data access benefits for hot data while also reducing overhead.

Note that the disclosed techniques do not add substantial computational overhead for cloud controllers; data accesses are typically delayed by disk delays, leaving substantial idle CPU and memory cycles during which optimizing techniques can be executed. The disclosed techniques can use such idle times to optimize data accesses and squeeze higher performance out of existing storage resources. Note that cloud controllers may simultaneously track data temperature and access information for a large number of hard drives and/or other storage devices.

Ensuring that hot data is stored (and rebalanced) towards the outside of disk platters improves the performance of multiple subsequent data accesses to the hot data, but interleaved requests for hot and cold data can result in cross-platter seeks that can re-introduce substantial delays for data accesses. For instance, a single user scanning a large amount of cold data (e.g., a user performing a search through archive data) might severely impact the performance of multiple other users accessing hot data sets. Hence, in some embodiments, cloud controllers are configured to maintain high I/O throughput across diverse workloads by rate-shaping disk requests. More specifically, cloud controllers can batch and/or slow down the rate at which disk access requests for cold(er) data are issued to ensure that accesses to hot data (in the short-stroked areas of the disk(s)) remain fast. Enforcing a rate limit for (and/or batching) accesses to slower portions of hard drives protects the efficiency of accessing the fastest portions of the hard drive and provides higher average system performance.

In some embodiments, a cloud controller selects a rate limit for client requests to cooler data based on a range of factors. For instance, the cloud controller may consider the amount of hot and cold data, the (temperature) balance of client requests, the size and frequency of client requests, the physical size of the disk, the rotational speed of the disk, the storage size of the disk, and client job priorities. For instance, upon determining that reads are three times faster on the outside of a disk platter than the inside, the cloud controller may choose to read three data portions from the outside for every data portion that is read from the outside. When receiving substantially more client requests for hot data, the cloud controller may adjust the ratio to read substantially more portions of hot data for every portion of cold data to prioritize higher-priority requests that would benefit from favorable data temperature mappings.

The described techniques differ from traditional caching techniques, which do not leverage rate control. More specifically, many caching systems (e.g., processor cache hierarchies) have hierarchical cache levels in which each cache level has a uniform access rate and different cache levels are connected by dedicated buses that are provisioned to support the maximum possible access rate of the next lower-level cache in the hierarchy. The non-uniform data access rates for different portions of a disk platter provide an opportunity to leverage rate control and provide an additional set of capabilities that further improve data performance.

In some embodiments, cloud controllers can also leverage solid state drives (SSDs) to further enhance caching of distributed filesystem data. Unlike rotating drives, SSDs have uniform access times across their entire storage area (e.g., no rotational latency nor seek time, and hence no seek-time differences based on disk locations). However, SSDs are also typically more expensive than rotating hard drives on a cost-per-storage-byte basis. Organizations using a pure short-stroking approach (e.g., using short-stroking that only leverages 20% of the hard drive, and thus wastes 80% of the available storage capacity) may benefit from using SSDs instead, and further benefit form the reduced power and cooling costs associated with SSDs. However, if the entire disk can be used for caching purposes (as described in the above techniques that leverage both short stroking and data tiering), the larger typical storage capacity of rotating drives facilitates caching larger amounts of unstructured data. Note that in the context of a distributed filesystem, maximizing the amount of cache space on a cloud controller facilitates improving the performance and reliability of the distributed filesystem. Accessing data in the cloud storage system is almost always likely to take longer than accessing data from local hard drives, so being able to cache more data locally on a cloud controller will typically involve less computational overhead and network delay than having to re-download and process (e.g., download, decrypt, unpack, etc.) data from a cloud storage system. Furthermore, if network connectivity is disrupted or the cloud storage system goes down for some reason, having larger storage capacity on each cloud controller facilitates providing a larger portion of the total data set to clients of that cloud controller during the disruption, resulting in higher overall reliability.

In some embodiments, cloud controllers may leverage both SSDs and rotating drives for caching purposes. For instance, a cloud controller may consider an SSD as another level in a data-tiering hierarchy, storing the hottest data on the SSD and then using a data temperature gradient as described above to distribute other lower-temperature data across the rotating. For example, in many access scenarios metadata is the hottest data; e.g., users may browse through a filesystem frequently, resulting in large numbers of metadata accesses until a specific file is identified and requested. Previously disclosed techniques separated metadata and data into different data regions to facilitate accessing metadata quickly and contiguously; storing the metadata on SSDs facilitates further optimizing the performance of metadata accesses, thereby speeding up the most common client filesystem operations. The larger space available on rotating disks can then be used to store the bulk of file data, leveraging the above-described short-stroking and data-tiering techniques to speed up file data accesses based on data temperature. Note that in some scenarios the metadata for the distributed filesystem may be sufficiently compact that additional space on the SSD can also be used to cache the hottest file data as well.

Note that the disclosed techniques can be deployed to, and add value to, existing cloud controllers that have been provisioned with rotating drives. Cloud controllers that are upgraded to incorporate the disclosed techniques can being tracking data temperatures for the local cached data and, (optionally) after some initial tracking interval, start moving cold data towards the inner edge of the disk platters and hot data towards the outer edge of the disk platters and begin employing rate-based control for data accesses. In this manner, the disclosed techniques can be seamlessly incorporated into deployed cloud controllers to add value and improve performance.

In summary, cloud controllers can leverage short-stroking and data-tiering techniques to optimize I/O performance for cached distributed-filesystem data. More specifically, cloud controllers can be configured to: 1) leverage metrics that track frequency and recency of data use to accurately predict frequently-accessed data in a multi-user caching environment; 2) locate (and move) cached data onto different regions on the disk platters of rotating disks based on such metrics; and 3) perform rate-shaping based on the temperature of cached data to optimize I/O performance. Moreover, cloud controllers can leverage a mix of rotating drives and SSDs to further optimize the total storage capacity and access performance of cached data accesses for the distributed filesystem.

Computing Environment

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. Additional techniques can be applied to reduce access and propagation delays for files that are being collaboratively edited and/or accessed by remote clients via different cloud controllers. Hence, the disclosed embodiments present an abstraction of one global, extensible filesystem while preserving the abstraction of high-speed local data access.

Figure 4:
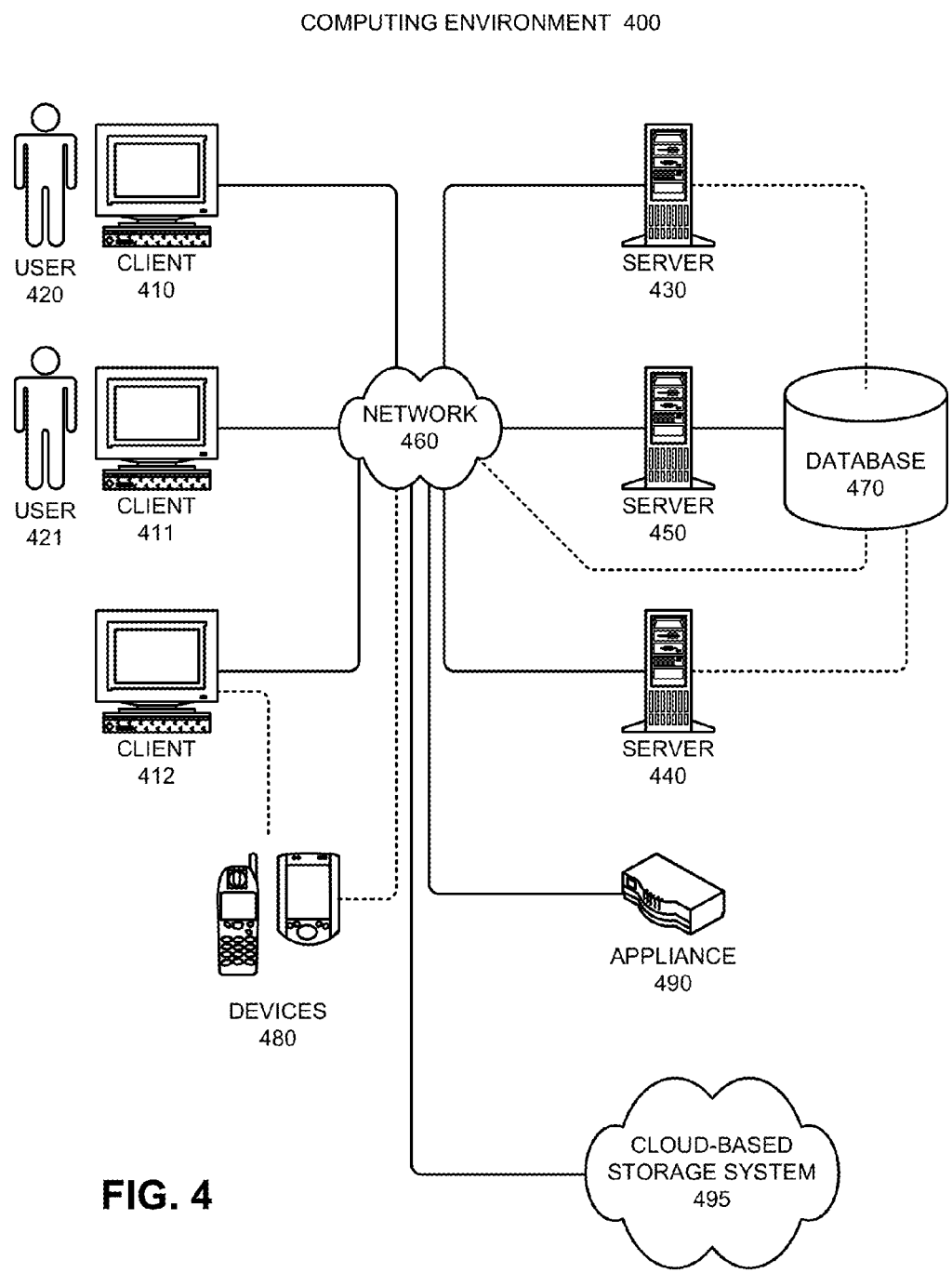
FIG. 4 illustrates a computing environment in accordance with an embodiment.

In some embodiments of the present invention, techniques for managing and/or accessing a distributed filesystem can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, appliance 490, and cloud-based storage system 495.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. Alternatively, other entities in computing environment 400 (e.g., servers 430-450) may also store such data.

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Cloud-based storage system 495 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
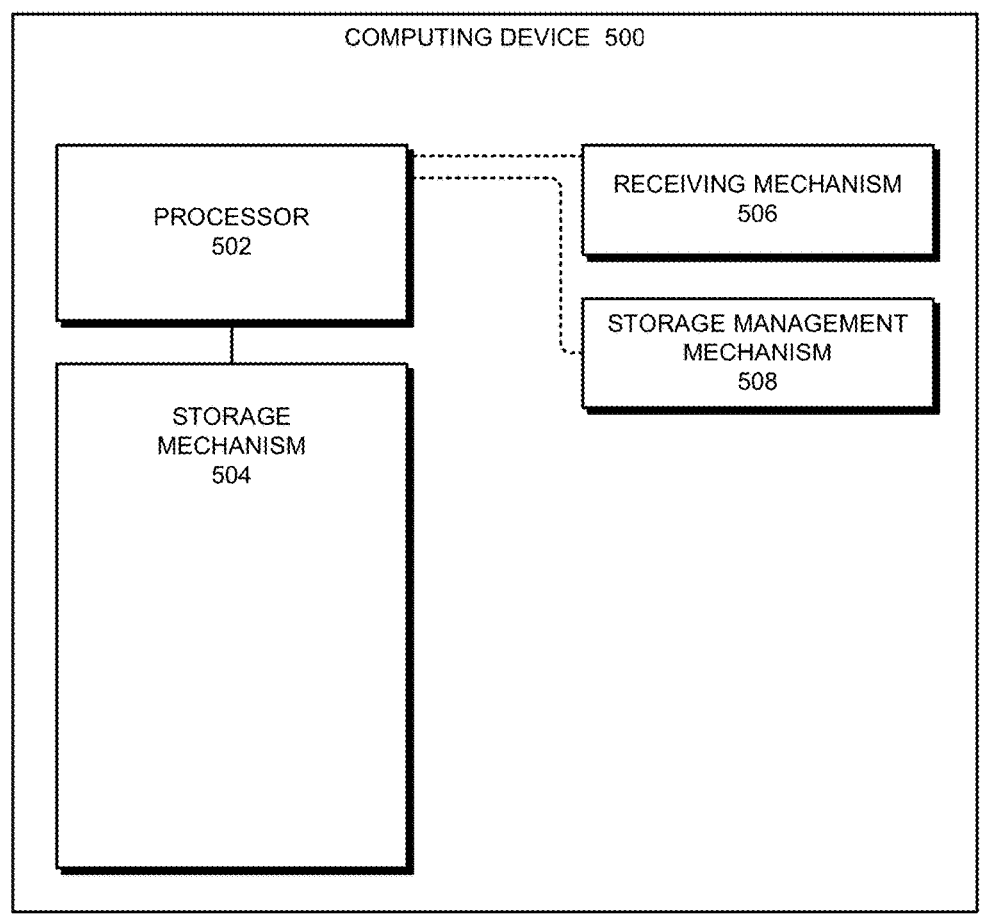
FIG. 5 illustrates a computing device in accordance with an embodiment.

FIG. 5 illustrates a computing device 500 that includes a processor 502 and a storage mechanism 504. Computing device 500 also includes a receiving mechanism 506 and a storage management mechanism 508.

In some embodiments, computing device 500 uses receiving mechanism 506, storage management mechanism 508, and storage mechanism 504 to manage data in a distributed filesystem. For instance, storage mechanism 504 can store metadata for a distributed filesystem, and computing device 500 can use receiving mechanism 506 to receive a request to access a data block for a file. Program instructions executing on processor 502 can traverse the stored metadata to identify a metadata entry that is associated with the data block. Storage management mechanism 508 can use this metadata entry to download a cloud file containing the data block from a cloud storage system.

In some embodiments of the present invention, some or all aspects of receiving mechanism 506, storage management mechanism 508, and/or a filesystem device driver can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of receiving mechanism 506, storage management mechanism 508, and/or a filesystem device driver may be performed using general-purpose circuits in processor 502 that are configured using processor instructions. Thus, while FIG. 5 illustrates receiving mechanism 506 and/or storage management mechanism 508 as being external to processor 502, in alternative embodiments some or all of these mechanisms can be internal to processor 502.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for optimizing caching performance for a distributed filesystem, the method comprising:
   collectively managing the data of the distributed filesystem using two or more cloud controllers, wherein collectively managing the data comprises storing the file data for the distributed filesystem in one or more cloud storage systems, wherein the cloud controllers cache and ensure data consistency for data stored in the cloud storage systems, wherein a cloud controller comprises a hard drive that caches distributed-filesystem data, wherein the hard drive comprises one or more rotating disk platters;
   collectively presenting a unified namespace for the distributed filesystem to the clients of the distributed filesystem via the two or more cloud controllers, wherein the clients access the distributed filesystem via the cloud controllers, wherein the cloud controllers cache a subset of the file data from the cloud storage systems that is being actively accessed by each respective cloud controller's clients, wherein new file data received by each cloud controller from its clients is written to the one or more cloud storage systems;
   maintaining at each cloud controller a copy of the metadata for the files stored in the distributed filesystem, wherein changes to the metadata for the distributed filesystem are communicated to the set of cloud controllers for the distributed filesystem to ensure that the clients of the distributed filesystem share a consistent view of the files in the distributed filesystem;
   determining that a hot subset of cached data stored on the hard drive is likely to be accessed frequently by clients of the cloud controller;
   determining that a cold subset of cached data stored on the hard drive is less likely to be accessed by clients of the cloud controller;
   storing the hot subset of cached data on an outside portion of a disk platter of the hard drive; and
   storing the cold subset of cached data on an inside portion of the disk platter;
   wherein the outside portion of the disk platter has higher I/O bandwidth than the inside portion of the disk platter.

2. The computer-implemented method of claim 1, wherein locating the hot subset of cached data on the outside portion of the disk platter comprises:
   maintaining a linear gradient of data temperatures across the disk platter, wherein higher data temperatures indicate a higher likelihood of subsequent accesses; and
   storing cached data across the disk platter according to calculated data temperatures and projected access patterns.

3. The computer-implemented method of claim 2, wherein the hot subset of cached data initially has a low data temperature, wherein locating the hot subset of cached data on the outside portion of the disk platter comprises:
   receiving a client request to access the hot subset of cached data;
   determining based on a set of tracked accesses for the hot subset of cached data that the data temperature of the hot subset has increased; and
   moving the hot subset of cached data from a section of the disk platter that is associated with a lower data temperature to the outside portion of the disk platter.

4. The computer-implemented method of claim 3,
   wherein the cloud controller determines the data temperature and location for the hot subset of cached data on the disk platter based on the frequency and recency of data use for the hot subset of cached data; and
   wherein raising the data temperature for the hot subset of cached data comprises determining that the hot subset of cached data is being accessed frequently by multiple users in a recent timeframe.

5. The computer-implemented method of claim 4, wherein the cloud controller determines the data temperature for the hot subset of cached data based on:
   the number of users that have accessed the hot subset of cached data;
   the number of times each user has accessed hot subset of cached data;
   the total number of times the hot subset of cached data has been accessed;
   the frequency and time distribution of accesses for the hot subset of cached data; and
   how recently users have accessed the hot subset of cached data.

6. The computer-implemented method of claim 5,
   wherein upon receiving a first request to access a subset of cached data, the cloud controller is configured to, upon determining that the subset of cached data is being accessed by a single user and has not been accessed in a long time interval, continue to consider the subset of cached data to have a low data temperature; and
   wherein upon receiving a subsequent request from a second distinct user in a short subsequent timeframe, the cloud controller increases the data temperature for the subset of cached data.

7. The computer-implemented method of claim 5,
   wherein cloud controllers exchange access records for their locally cached data; and
   wherein the cloud controller considers data accesses on remote cloud controllers when determining data temperatures for locally cached data.

8. The computer-implemented method of claim 2, wherein the cloud controller limits the rate at which data on the inside portion of the disk platter can be accessed.

9. The computer-implemented method of claim 8,
wherein the cloud controller delays requests to access the inside portion of the disk platter while performing multiple subsequent accesses to the outside portion of the disk platter;
wherein the cloud controller batches two or more requests to the inside portion of the disk platter together to amortize seek delays to the inside portion of the disk platter; and
wherein rate-limiting accesses to the inside portion of the disk platter facilitates optimizing I/O performance for hot cached data that is cached on the hard drive.

10. The computer-implemented method of claim 2,
wherein the cloud controller further comprises a solid-state drive (SSD);
wherein the cloud controller is configured to cache metadata for the distributed filesystem on the SSD; and
wherein the cloud controller is configured to cache file data for the distributed filesystem on the hard drive using linear gradient of data temperatures.

11. A non-transitory computer-readable storage medium storing instructions that when executed by a computer cause the computer to perform a method for optimizing caching performance for a distributed filesystem, the method comprising:
collectively managing the data of the distributed filesystem using two or more cloud controllers, wherein collectively managing the data comprises storing the file data for the distributed filesystem in one or more cloud storage systems, wherein the cloud controllers cache and ensure data consistency for data stored in the cloud storage systems, wherein a cloud controller comprises a hard drive that caches distributed-filesystem data, wherein the hard drive comprises one or more rotating disk platters;
collectively presenting a unified namespace for the distributed filesystem to the clients of the distributed filesystem via the two or more cloud controllers, wherein the clients access the distributed filesystem via the cloud controllers, wherein the cloud controllers cache a subset of the file data from the cloud storage systems that is being actively accessed by each respective cloud controller's clients, wherein new file data received by each cloud controller from its clients is written to the one or more cloud storage systems;
maintaining at each cloud controller a copy of the metadata for the files stored in the distributed filesystem, wherein changes to the metadata for the distributed filesystem are communicated to the set of cloud controllers for the distributed filesystem to ensure that the clients of the distributed filesystem share a consistent view of the files in the distributed filesystem;
determining that a hot subset of cached data stored on the hard drive is likely to be accessed frequently by clients of the cloud controller;
determining that a cold subset of cached data stored on the hard drive is less likely to be accessed by clients of the cloud controller;
storing the hot subset of cached data on an outside portion of a disk platter of the hard drive; and
storing the cold subset of cached data on an inside portion of the disk platter;
wherein the outside portion of the disk platter has higher I/O bandwidth than the inside portion of the disk platter.

12. The non-transitory computer-readable storage medium of claim 11, wherein locating the hot subset of cached data on the outside portion of the disk platter comprises:
maintaining a linear gradient of data temperatures across the disk platter, wherein higher data temperatures indicate a higher likelihood of subsequent accesses; and
storing cached data across the disk platter according to calculated data temperatures and projected access patterns.

13. The non-transitory computer-readable storage medium of claim 12, wherein the hot subset of cached data initially has a low data temperature, wherein locating the hot subset of cached data on the outside portion of the disk platter comprises:
receiving a client request to access the hot subset of cached data;
determining based on a set of tracked accesses for the hot subset of cached data that the data temperature of the hot subset has increased; and
moving the hot subset of cached data from a section of the disk platter that is associated with a lower data temperature to the outside portion of the disk platter.

14. The non-transitory computer-readable storage medium of claim 13,
wherein the cloud controller determines the data temperature and location for the hot subset of cached data on the disk platter based on the frequency and recency of data use for the hot subset of cached data; and
wherein raising the data temperature for the hot subset of cached data comprises determining that the hot subset of cached data is being accessed frequently by multiple users in a recent timeframe.

15. The non-transitory computer-readable storage medium of claim 14, wherein the cloud controller determines the data temperature for the hot subset of cached data based on:
the number of users that have accessed the hot subset of cached data;
the number of times each user has accessed hot subset of cached data;
the total number of times the hot subset of cached data has been accessed;
the frequency and time distribution of accesses for the hot subset of cached data; and
how recently users have accessed the hot subset of cached data.

16. The non-transitory computer-readable storage medium of claim 15,
wherein upon receiving a first request to access a subset of cached data, the cloud controller is configured to, upon determining that the subset of cached data is being accessed by a single user and has not been accessed in a long time interval, continue to consider the subset of cached data to have a low data temperature; and
wherein upon receiving a subsequent request from a second distinct user in a short subsequent timeframe, the cloud controller increases the data temperature for the subset of cached data.

17. The non-transitory computer-readable storage medium of claim 15,
wherein cloud controllers exchange access records for their locally cached data; and
wherein the cloud controller considers data accesses on remote cloud controllers when determining data temperatures for locally cached data.

18. A cloud controller that optimizes caching performance for a distributed filesystem, comprising:
- a processor;
- a hard drive that caches distributed-filesystem data, wherein the hard drive comprises one or more rotating disk platters; and
- a storage management mechanism;
- wherein two or more cloud controllers collectively manage the data of the distributed filesystem, wherein collectively managing the data comprises storing the file data for the distributed filesystem in one or more cloud storage systems, wherein the cloud controllers cache and ensure data consistency for data stored in the cloud storage systems, wherein the cloud controllers collectively present a unified namespace for the distributed filesystem to the clients of the distributed filesystem, wherein the clients access the distributed filesystem via the cloud controllers, wherein the cloud controllers cache a subset of the file data from the cloud storage systems that is being actively accessed by each respective cloud controller's clients, wherein new file data received by each cloud controller from its clients is written to the one or more cloud storage systems, wherein each cloud is configured to maintain a copy of the metadata for the files stored in the distributed filesystem, wherein changes to the metadata for the distributed filesystem are communicated to the set of cloud controllers for the distributed filesystem to ensure that the clients of the distributed filesystem share a consistent view of the files in the distributed filesystem;
- wherein the cloud controller is configured to:
  - determine that a hot subset of cached data stored on the hard drive is likely to be accessed frequently by clients of the cloud controller and store the hot subset of cached data on an outside portion of a disk platter of the hard drive; and
  - determine that a cold subset of cached data stored on the hard drive is less likely to be accessed by clients of the cloud controller and store the cold subset of cached data on an inside portion of the disk platter; and
- wherein the outside portion of the disk platter has higher I/O bandwidth than the inside portion of the disk platter.

* * * * *